United States Patent
Hasegawa

(10) Patent No.: US 7,696,720 B2
(45) Date of Patent: Apr. 13, 2010

(54) BATTERY PACK AND ELECTRONIC DEVICE

(75) Inventor: Tohru Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 11/698,850

(22) Filed: Jan. 29, 2007

(65) Prior Publication Data
US 2008/0084180 A1   Apr. 10, 2008

(30) Foreign Application Priority Data
Sep. 29, 2006   (JP) .............................. 2006-268090

(51) Int. Cl.
*H02J 7/00* (2006.01)
(52) U.S. Cl. ..................... 320/112; 320/106; 320/114
(58) Field of Classification Search ................ 320/106, 320/112, 114
See application file for complete search history.

(56) References Cited

U.S. PATENT DOCUMENTS 6,522,361 B2 *   2/2003   Higuchi et al. .............. 348/372

2003/0151517 A1 *   8/2003   Nishihara et al. ........... 340/665
2005/0093371 A1 *   5/2005   Zdziech et al. ............. 307/10.1

FOREIGN PATENT DOCUMENTS

| JP | 2001-144853 | 5/2001 |
| JP | 2006-119484 | 5/2006 |

* cited by examiner

*Primary Examiner*—Edward Tso
*Assistant Examiner*—Samuel Berhanu
(74) *Attorney, Agent, or Firm*—Staas & Halsey LLP

(57) ABSTRACT

A battery pack includes a battery, a pair of output terminals connected to the battery, a switch inserted between the battery and one of the pair of output terminals, an acceleration sensor detecting a shock and outputting a detected value dependent thereon, and a control unit of a protection circuit. When a detected value of the acceleration sensor is equal to or greater than a predetermined threshold value, the control unit turns off the switch and thereby cuts off a current path between the battery and the pair of output terminals to cut off the current.

18 Claims, 8 Drawing Sheets

FIG. 2A
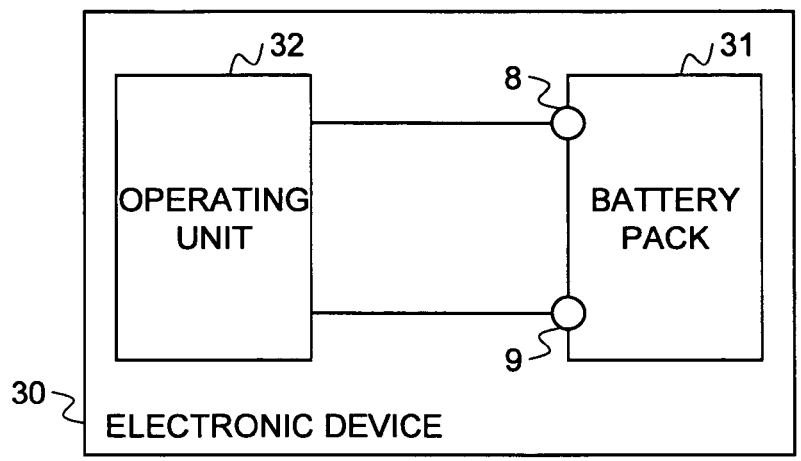
FIG. 2B
| THE NUMBER OF TIMES | DETECTED VOLTAGE | DETECTION DATE AND TIME |
|---|---|---|
| 1 | aa | c YEAR  c MONTH  c DAY<br>c HOUR  c MINUTE |
| 2 | bb | d YEAR  d MONTH  d DAY<br>d HOUR  d MINUTE |
| ⋮ | ⋮ | ⋮ |
FIG. 2C
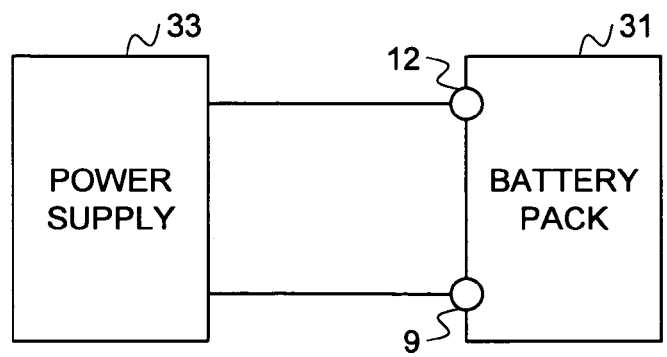

BATTERY PACK AND ELECTRONIC DEVICE

CROSS-REFERENCE TO RELATED APPLICATIONS

This application claims the conventional priority based on Japanese Patent Application No. 2006-268090, filed on Sep. 29, 2006, the disclosures of which are incorporated herein by reference.

BACKGROUND OF THE INVENTION

1. Field of the Invention

This invention relates to a battery pack and an electronic device, and more particularly to a battery pack and an electronic device which detects a shock and disables the battery pack in a predetermined case, the battery being used in the electronic device being capable of carried.

2. Description of the Related Art

Electronic devices such as a note-type or lap-top type personal computer (notebook computer) or digital camera uses a battery (or cell), and can be brought and used in the outdoors where electricity is not available. However, it is possible that the electronic device is inadvertently dropped and a shock is given on the electronic device, when they are carried, Thus, for example, there has been proposed that, when a strong shock is given on the mobile phone, the shock is detected to create a history of the degree of shock, the number of shocks and the like by an acceleration sensor which is mounted on a mobile phone (refer to Patent Document 1; Japanese Patent Laid-Open No. 2006-119484). Accordingly, it is possible to check a history of shock by then such as what degree of shock has been given on the mobile phone and how often shocks have been given.

When a shock is given on an electronic device such as a mobile phone, a battery pack also receives the shock which is mounted therein as the power source of the electronic device. There is no problem which has been raised by the shock given on a battery pack until now.

However, since the output voltage of a battery pack has been increased, a shock given on the battery pack has become not negligible. More specifically, a lithium-ion battery is mainly used as a battery for electronic devices such as a notebook computer or digital camera at present. The output voltage of lithium-ion battery is 4.2 V/cell, for example, being significantly high. Particularly, in a notebook computer, a plurality of lithium-ion batteries are combined to constitute a pack (a battery pack). Accordingly, the output voltage of the battery pack becomes much higher. For example, when four lithium-ion batteries are connected in series, an output voltage is 16.8 V.

I studied on a battery pack and found, when the battery pack of lithium-ion battery which has received shocks several times in the past continues to be used, the following problem may arise.

An additional shock of a certain strength is further given after shocks have been given several times in the past. In this case, there may occur a short circuit in the inside of a lithium-ion battery constituting the battery pack, and bring into fire. Also, the battery pack of lithium-ion battery for a notebook computer is constituted of an assembled battery (a combination of a plurality of batteries). Accordingly, when a shock of a certain strength is given, the balance between individual lithium-ion batteries is broken. As a result, charging or discharging phenomena may concentrate to a particular lithium-ion battery, and overcharge or over-discharge is likely to concentrate. This is very dangerous.

Thus, when a battery pack of lithium-ion battery receives a strong shock, the output current from the battery pack must be cut off, and change the battery pack to a disabled state to prevent troubles such as catching-fire caused by a short circuit in the inside of the lithium-ion battery, and overcharge or over-discharge cause by a breakdown of the cell balance between the lithium-ion batteries.

SUMMARY OF THE INVENTION

It is an object of the present invention to provide a battery pack capable of detecting a shock and disabling the battery pack in a predetermined case.

It is another object of the present invention to provide an electronic device which is operated using a battery pack having mounted therein capable of detecting a shock and disabling the battery pack in a predetermined case.

A battery pack of the present invention includes a battery, an output terminal outputting an output of the battery to the outside, detection means for detecting a shock and outputting a detected value dependent on the detection, and output control means for cutting off the output of the battery from the output terminal when the detected value of the detection means is equal to or greater than a predetermined threshold value.

Preferably, according to one embodiment of the present invention, the output terminal is a pair of terminals connected to the battery. The output control means further includes a switch inserted between the battery and one of the pair of terminals, and a control unit cutting off a current path between the battery and the pair of terminals by turning off the switch when the detected value of the detection means is equal to or greater than the predetermined threshold value.

Preferably, according to one embodiment of the present invention, the battery pack further includes a storage unit storing a shock history which is a history of shock detected by the detection means. When the detected value of the detection means is equal to or greater than a threshold value, the control unit stores the detected value and a number of times of the detected value exceeding the threshold value as the shock history into the storage unit.

Preferably, according to one embodiment of the present invention, when the control unit detects an instruction signal to instruct for executing a recovery processing, the control unit forms a current path between the battery and the pair of output terminals to allow the current to flow by turning on the switch.

Preferably, according to one embodiment of the present invention, when the control unit detects the instruction signal, the control unit reads the shock history from the storage unit, and turns on the switch when the number of times of the detected value exceeding the threshold value is equal to or less than a predetermined value so that a current path forms between the battery and the pair of output terminals to allow the current to flow, or leaves the switch unchanged at the off state when the number of times of the detected value exceeding the threshold value is greater than the predetermined value.

Preferably, according to one embodiment of the present invention, the battery pack further includes a data output terminal provided separately from the pair of output terminals and reading the shock history from the storage unit. The battery pack outputs the shock history through the data output terminal.

Preferably, according to one embodiment of the present invention, the battery pack further includes a fuse provided between the battery and the pair of output terminals, and a fuse cutting circuit cutting the fuse. The control unit reads the shock history from the storage unit, and sends a cutting signal to the fuse cutting circuit when the number of times of the detected value exceeding the threshold value is greater than a predetermined value, and the fuse cutting circuit cuts the fuse based on the cutting signal.

An electronic device of the present invention includes a battery pack detachably mounted on the electronic device, and a load driven by an electric power supplied from the battery pack. The battery pack further includes a battery, an output terminal outputting an output of the battery to the outside, detection means for detecting a shock and outputting a detected value dependent on the detection, and output control means for cutting off an output of the battery from the output terminal when the detected value of the detection means is equal to or greater than a predetermined threshold value.

According to the battery pack of the present invention, when the detected value of the detection means is equal to or greater than a predetermined threshold value, the control unit cuts off a current path between the battery and the pair of output terminals to cut off the current, for example. Accordingly, when the battery pack constituted of lithium-ion batteries or the like receives a strong shock, for example, it is possible to cut off the output from the battery pack, and to change the battery pack to a disabled state. As a result, it is possible to prevent catching-fire caused by a short circuit in the inside of the battery (individual cells), to prevent a breakdown of a cell balance between cells constituting the battery, and to prevent preventing troubles such as overcharge or over-discharge due to the breakdown.

According to the one embodiment of the present invention, in the output control means, the control unit turns off the switch when the detected value of the detection means is equal to or greater than a predetermined threshold value, whereby the current path between the battery and the pair of terminals is cut off. Accordingly, for example, a current path between the battery and the pair of output terminals can be easily and securely cut off.

According to the one embodiment of the present invention, when the detected value of the detection means is equal to or greater than a threshold value, the detected value and the number of times of the detected value exceeding the threshold value are stored as a shock history. Accordingly, instead of turning off the switch in the same way when the detected value exceeds the threshold value, the current path can be cut off properly based on the shock history.

According to the one embodiment of the present invention, the control unit turns on the switch and thereby forms a current path between the battery and the pair of output terminals to allow the current to flow. Accordingly, the battery pack having the current path which is once cut off by turning off the switch can be returned to an enabled state in a range in which safety is fixed based on experience.

According to one embodiment of the present invention, when the number of times of the detected value exceeding the threshold value is equal to or less than a predetermined value, the switch is turned on, whereby the current path between the battery and the pair of output terminals is formed to allow the current to flow, and, when the number of times of the detected value exceeding the threshold value is greater than the predetermined number of times, the switch remains unchanged at the off state. Accordingly, based on both of the detected value and the number of times of the detected value exceeding the threshold value, turn on/off control of the switch can be performed in a range in which safety is fixed based on experience.

According to the one embodiment of the present invention, the battery pack outputs a shock history through the data output terminal. Accordingly, the user can check the shock history of the battery pack, and can recognize the presence of shocks given on the battery pack as one reason for troubles of the battery pack.

According to the one embodiment of the present invention, when the number of times of the detected value exceeding the threshold value is equal to or greater than a predetermined number of times, the control unit sends a cutting signal to the fuse cutting circuit, and the fuse cutting circuit cuts off the fuse based on the cutting signal. Accordingly, current can be prevented from flowing from the battery pack thereafter, whereby the battery pack can be securely changed to a disabled state.

According to the electronic device of the present invention, since the battery pack of the present invention is mounted therein, when the detected value of the detection means is equal to or greater than a predetermined threshold value, the output from the battery pack can be cut off to change the battery pack to a disabled state, as described above. As a result, troubles such as catching-fire, overcharge or over-discharge of the battery can be prevented. Accordingly, failures or accidents of the electronic device due to the battery pack can be prevented from occurring, whereby safety can be ensured for the user.

BRIEF DESCRIPTION OF THE DRAWINGS

FIGS. 2A to 2C, 3A and 3B are an explanatory view of the battery pack according to the present invention.

DETAILED DESCRIPTION OF THE PREFERRED EMBODIMENTS

Figure 1:
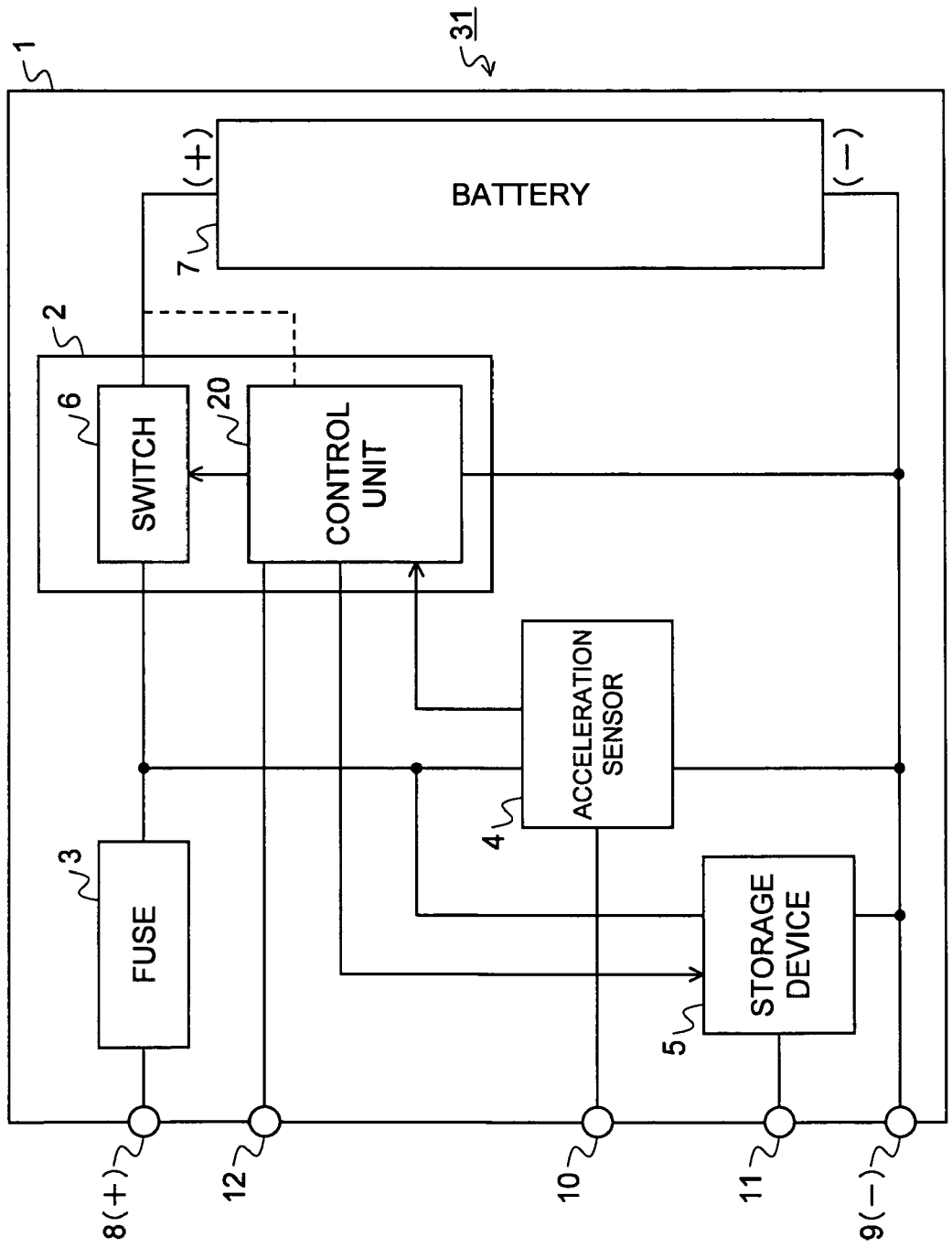
FIG. 1 is a configuration diagram illustrating an exemplary battery pack according to the present invention.

FIG. 1 is a configuration diagram illustrating an exemplary battery pack of the present invention. FIGS. 2 and 3 are an explanatory view of the battery pack of the present invention.

As shown in FIG. 1, a battery pack 31 includes a housing 1 thereof, a protection circuit 2, a fuse 3, an acceleration sensor 4, a storage device 5, a switch 6 and a battery 7. The switch 6 is provided (or arranged) in the protection circuit 2. The protection circuit 2 (control unit 20), acceleration sensor 4, storage device 5 and switch 6 constitute output control means. The acceleration sensor 4 constitutes shock detection means. Also, the battery pack 31 or the housing 1 has a pair of output terminals 8 and 9, and in addition to this, a sensor output terminal 10, a data output terminal 11 and a recovery terminal 12, which are provided separately (or independently) from the pair of output terminals 8 and 9.

The battery 7 is detachably fixed to the housing 1, and constituted of a plurality of batteries (cells) connected in series. In this example, though not shown, four lithium-ion batteries are connected in series. In this case, the output voltage of the battery 7 is 4.2 (V/cell)×4 (cell)=16.8 (V), for example. The battery 7 is sealed within the housing 1 along with the protection circuit 2 and the like, thus constituting one pack (a battery pack 31). The battery pack 7 may be constituted of the batteries other than lithium-ion batteries. Also, the number of batteries is not limited to four, but may be one.

The output voltage of the battery 7 is outputted between the output terminals 8 and 9. The output terminal 8 is a positive voltage terminal, and the output terminal 9 is a negative voltage terminal (a terminal of ground potential or reference potential). As shown in FIG. 2A, the battery pack 31 is mounted (or attached) on an electronic device 30 such as a notebook computer, digital camera or mobile phone. The battery pack 31 supplies power source to an operating unit (or load) 32 of the electronic device 30 through the output terminals 8 and 9. The battery pack 31 is fixed to a housing (not shown) of the electronic device. When the electronic device 30 is a notebook computer, for example, the operating unit 32 is constituted of the main part of the computer. Current from the battery 7 is outputted from the output terminal 8 to the operating unit 32 through the switch 6 and the fuse 3. The fuse 3 is melted when excessive current flows therethrough, for example, thereby protecting the electronic device 30 (the operating unit 32 thereof) from overcurrent.

The protection circuit 2 includes the switch 6, and the control unit 20 which is a protection processing unit executing a protecting processing for protecting the battery pack 31 from shock. The control unit 20 comprises a computer which has a CPU and main memory (not shown) and is implemented by causing the CPU to execute a relevant control program stored in the main memory. The control unit 20 performs turn-on/off control of the switch 6 based on a result of shock detection described later by the acceleration sensor 4.

The switch 6 comprises a switching device such as a known transistor, for example. As the switching device, MOSFET, power MOSFET or the like is used, for example. When the switch 6 is turned on, the switch 6 outputs current from the battery 7 to the output terminal 8, and, when the switch 6 is turned off, the switch 6 cuts off current from the battery 7. When the switch 6 is turned off, no current flows from the battery pack 31, and thus the battery pack 31 is changed to a disabled state. In this example, the switch 6 is provided integrally with the control unit 20 in the protection circuit 2, but may be provided outside the protection circuit 2. It is sufficient that the switch 6 is inserted in series between the battery 7 (the positive output terminal thereof) and the fuse 3.

The acceleration sensor 4 is fixed to the housing 1, has a known configuration, and comprises a three-dimensional (three-axis) acceleration sensor, for example. The acceleration sensor 4 detects a shock given on the battery pack 31 as an acceleration, and outputs a voltage (voltage value) proportional to the acceleration as a detected value. The magnitude (strength) of shock is represented by a voltage value. The shock is stronger and stronger, a voltage value detected becomes higher and higher. When a shock is given on the battery pack 31, a voltage is outputted from the acceleration sensor 4, inputted to the protection circuit 2, and read by the control unit 20. The control unit 20 (or the protection circuit 2) includes an AD converter (not shown), converts the voltage value (analog value) from the acceleration sensor 4 into a digital value, and thereafter reads the digital value.

When the read voltage value (that is, the voltage value outputted by the acceleration sensor 4) is smaller than (or equal to or less than) a threshold value, no processing is performed by the control unit 20. That is, the switch 6 is not operated, and remains unchanged at the on state. The threshold value (threshold value of shock strength) is set to a predetermined value in advance, and stored in the control unit 20. The threshold value can be set based on experience.

Every time whenever the read voltage value is equal to or greater than (or greater than) a threshold value, the control unit 20 stores (writes) the read voltage value into the storage device 5 in that order. Accordingly, in the storage device 5, there is stored a shock history which is a history of shock given on the battery pack 31. The storage device 5 comprises a nonvolatile rewritable memory, for example, a flash memory.

As shown in FIG. 2B, the shock history includes, for example, "detected voltage" read each time, aa, bb, ... and the previous "number of times" of shock, 1, 2, .... Accordingly, the shock history includes the detected value and the number of times of the detected value exceeding the threshold value. The control unit 20 holds the previous number of times N of writing into the storage device 5 and adds 1 to N to calculate the number of times N+1 of shock. The value N+1 is held as "the number of times of writing" updated. Using a timer (not shown) included in the CPU of the control unit 20, the time and date of reading the relevant voltage may be additionally stored as "detection date and time".

Thereafter, the control unit 20 changes the switch 6 to an off state. As a result, the current flowing from the battery 7 to the output terminal 8 is cut off, so the battery pack 31 is changed to a disabled state. Consequently, when a shock of a certain strength is given on the battery pack 31, current is temporarily prevented from flowing. In this state, even when a voltage is applied between the output terminals 8 and 9 of the battery pack 31, the switch 6 will not be turned on.

Figure 7:
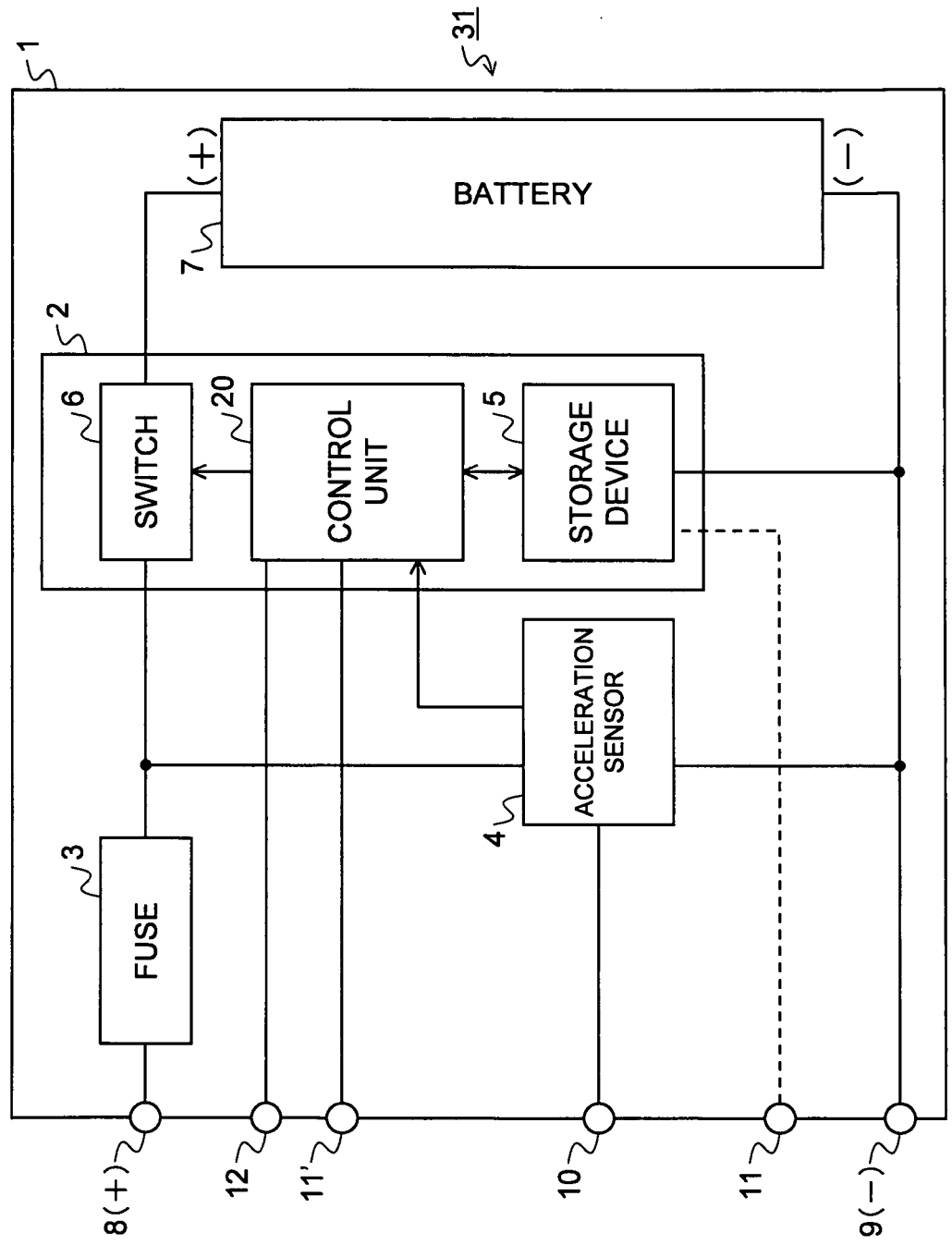
FIG. 7 is a configuration diagram illustrating another exemplary battery pack according to the present invention.
Figure 8:
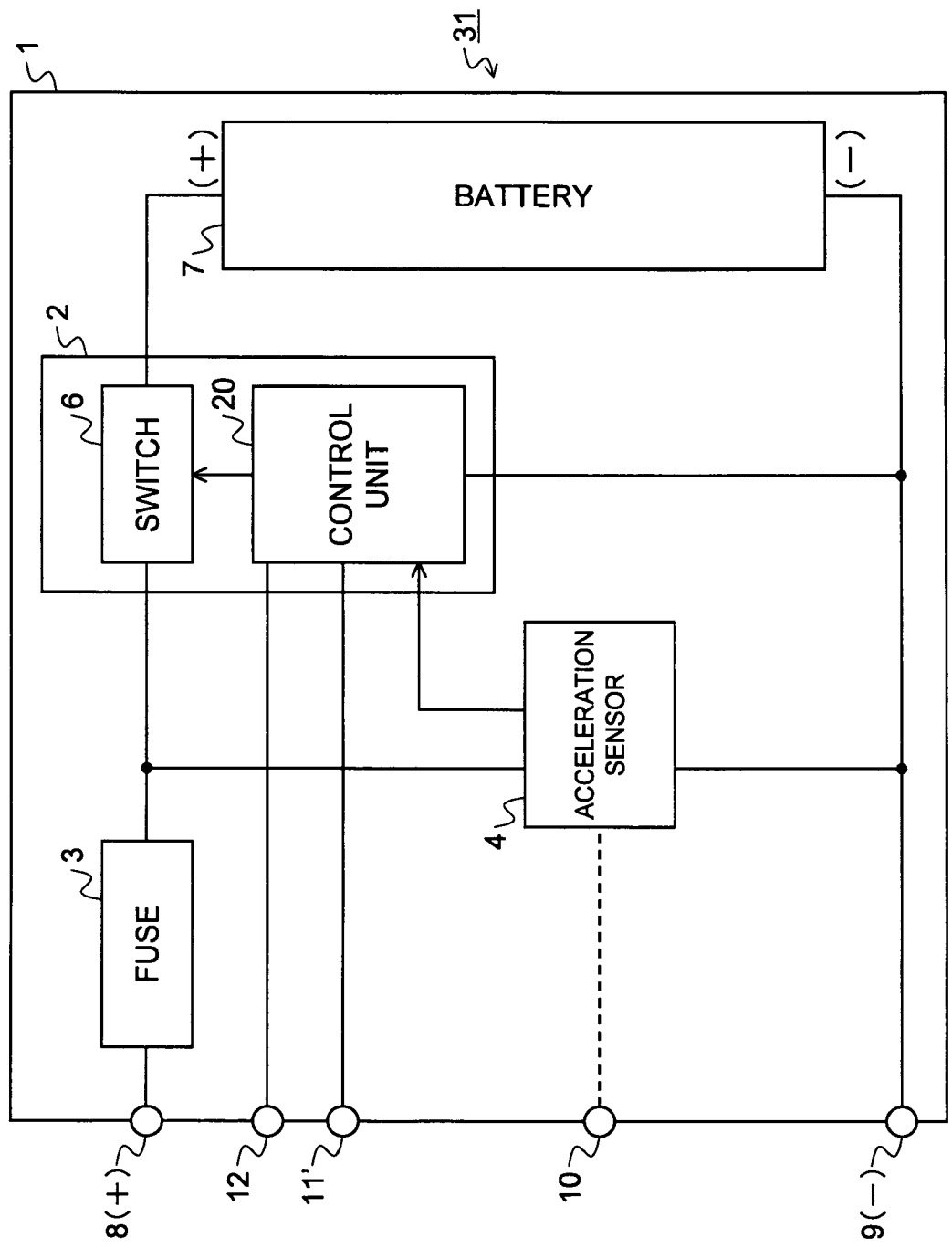
FIG. 8 is a configuration diagram illustrating still another exemplary battery pack according to the present invention.
Figure 9:
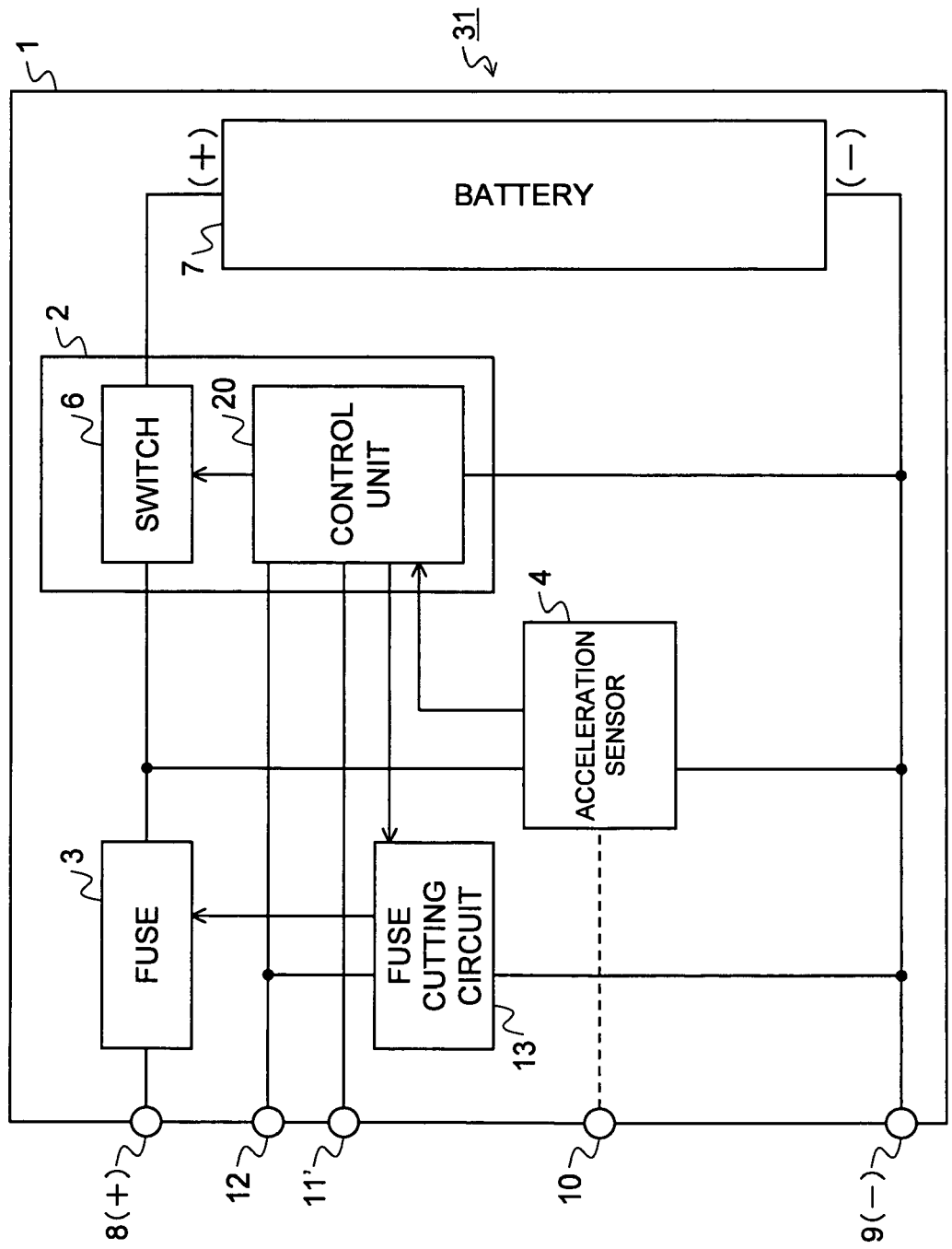
FIG. 9 is a configuration diagram illustrating still another exemplary battery pack according to the present invention.

After the switch 6 has been turned off, also, electrical power is supplied from the battery 7 to the control unit 20 (or protection circuit 2) through a power line indicated by the broken line in FIG. 1 (the broken line is omitted in FIGS. 7, 8, and 9). Accordingly, the control unit 20 can detect that a voltage has been applied to the recovery terminal 12. It is sufficient that the electrical power is minimum one, so it is preferable that a switch (not shown) similar to the switch 6 is also inserted in the current path indicated by the broken line in FIG. 1. This switch is turned on/off in a complementary manner relative to the switch 6, being a switching device (MOSFET) of a small size for limiting the current.

The battery pack 31 which has become disabled can be returned to an enabled state. First, the battery pack 31 is removed (or detached) from the electronic device 30. Thereafter, as shown in FIG. 2C, a predetermined voltage is applied between the recovery terminal 12 and the output terminal 9 of the battery pack 31 from a power supply 33. The recovery terminal 12 and output terminal 9 are used as the positive voltage terminal and negative voltage terminal, respectively. The voltage applied to the recovery terminal 12 corresponds to the instruction signal of the control unit 20 for giving an instruction of executing a recovery processing, and is the power source which drives the control unit 20 and like.

When a voltage is applied to the recovery terminal 12, the control unit 20 detects the voltage and then reads (reads out) the previous number of times of shock from the storage device 5. Then, when the read number of times of shock is equal to or less than (or smaller than) a predetermined value (for example, 10), the control unit 20 changes the switch 6 from the off state to the on state. The predetermined value is determined based on experience. Accordingly, the current path between the battery 7 and the output terminal 8 is formed again. As a result, the battery pack 31 is returned to an enabled state.

On the other hand, when the read number of times of shock is greater than (or equal to or greater than) the predetermined value, the control unit 20 keep the switch 6 at the off state. Accordingly, the current path between the battery 7 and the output terminal 8 remains cut off, whereby it is not possible to change the battery pack 31 to an enabled state. The battery pack 31 which cannot be changed to an enabled state in this manner is regarded as being in a discard state (a state that the battery pack 31 cannot be used at all). That is, when this battery pack 31 is used again, a dangerous state may occur, so this battery is regarded as being in a state where the battery cannot be restored. Since the threshold value for the number of times of shock and the threshold value for shock strength are set in this manner, when the battery 7 or the battery pack 31 receives a shock of a certain strength a predetermined number of times, no current is made to flow thereafter. Accordingly, catching-fire caused by a short circuit in individual batteries (or cells) constituting the battery 7 is prevented from occurring, and overcharge or over-discharge due to a breakdown of the cell balance between individual batteries is prevented from occurring, whereby safety can be ensured for the user.

Figure 3A:
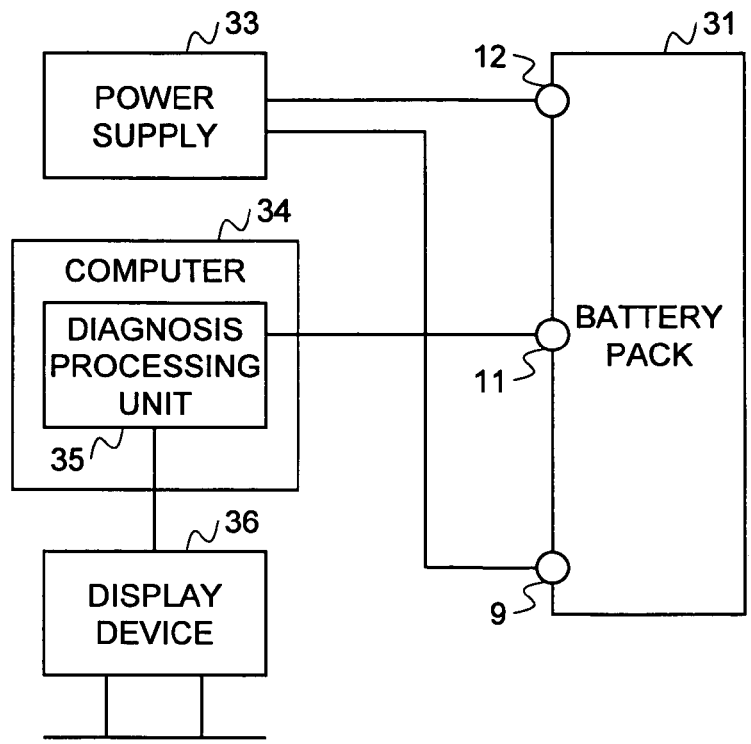

For example, when the battery pack 31 is changed to a disabled state, its shock history can be checked. The same also applies to when a discard state occurs. While a predetermined voltage is applied between the recovery terminal 12 and output terminal 9 of the battery pack 31 from the power supply 33, the data output terminal 11 is connected to an external computer 34, as shown in FIG. 3A. Though not shown in FIG. 1, the storage device 5 is driven by an electrical power supplied to the recovery terminal 12. Alternatively, the computer 34 may supply an electrical power capable of driving the control unit 20, the storage device 5 and the like through the data output terminal 11 such as a USB terminal (the same also applies to a detection processing unit 37 described later).

The computer 34 includes a diagnosis processing unit 35 for the battery pack 31. The diagnosis processing unit 35 is implemented by causing a CPU to execute a relevant diagnosis program stored in a main memory of the computer 34 (the same also applies to a detection processing unit 37 described later).

The diagnosis processing unit 35 accesses the storage device 5 through the data output terminal 11 to reads out the content of the storage device 5, and displays a shock history as shown in FIG. 2B on a display device 36. Accordingly, the user can check the shock history of the battery pack 31 and can recognize the existence of shocks given on the battery pack 31 as one reason for troubles of the battery pack 31.

Figure 3B:
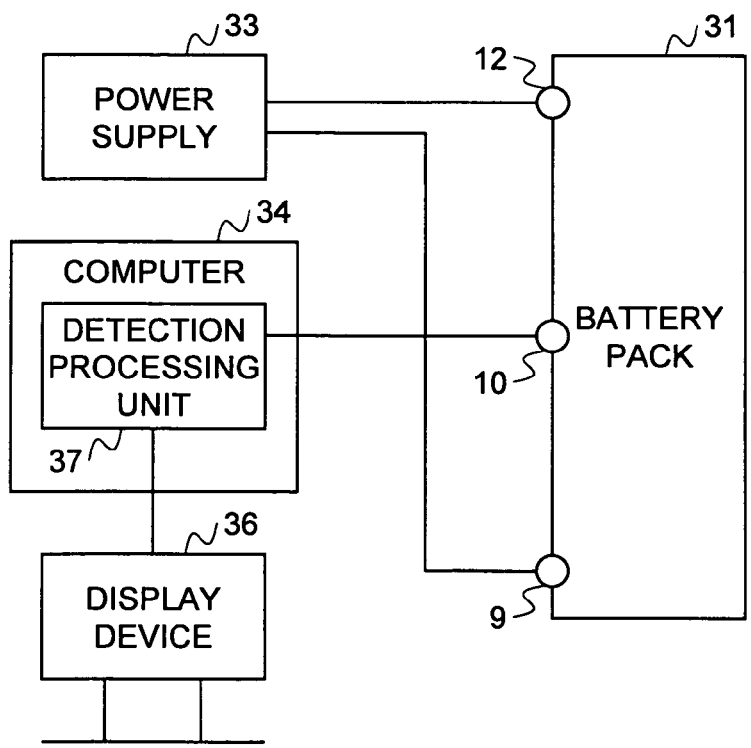

For example, when the battery pack 31 becomes to a disabled state, it can be inspected whether the acceleration sensor 4 operates properly. The same also applies to when a discard state occurs. As described above, while a predetermined voltage is applied between the recovery terminal 12 and output terminal 9 of the battery pack 31 from the power supply 33, as shown in FIG. 3B, the detection means output terminal (sensor output terminal) 10 is connected to the computer 34. Though not shown in FIG. 1, the acceleration sensor 4 is driven by an electrical power supplied to the recovery terminal 12.

The battery pack 31 is mounted on an accelerating device (not shown) capable of applying an acceleration and then an acceleration of a given magnitude is given on the battery pack 31. Similarly to the control unit 20, the detection processing unit 37 reads a detected voltage outputted from the acceleration sensor 4 through the sensor output terminal 10 and displays the voltage on the display device 36. As a result, the user can check whether or not the output of the acceleration sensor 4 is correct, and can recognize the existence of malfunction of the acceleration sensor 4 as one reason for troubles of the battery pack 31.

Figure 4:
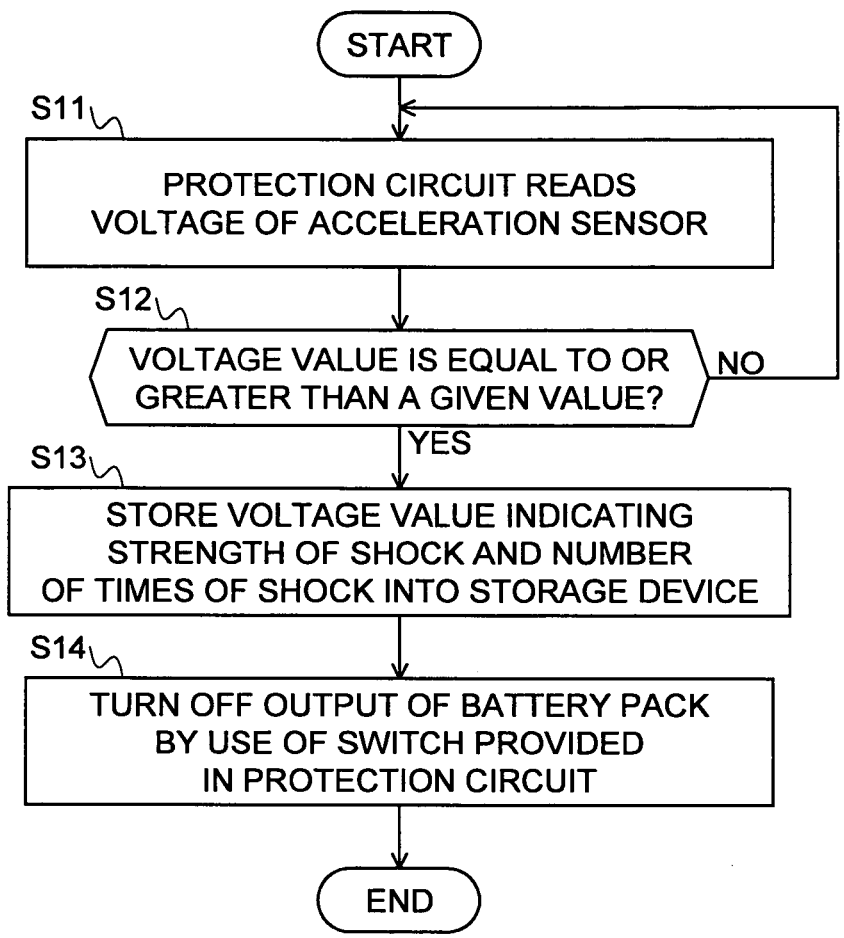
FIG. 4 is a protection process flowchart of the battery pack according to the present invention.

FIG. 4 is a protection process flowchart of the battery pack according to the present invention. The control unit 20 of the protection circuit 2 reads a voltage outputted from the acceleration sensor 4 (step S11), and checks whether or not the read voltage value is equal to or greater than a threshold value (step S12). When the read voltage value is not equal to or greater than the threshold value, the step S11 and subsequent steps are repeated. When the read voltage value is equal to or greater than the threshold value, the control unit 20 stores in the storage device 5 the voltage value indicating a strength of shock (step S13), and the previous number of times of shock and turns off the switch 6 to thereby cut off the output of the battery pack 31 (step S14).

Figure 5:
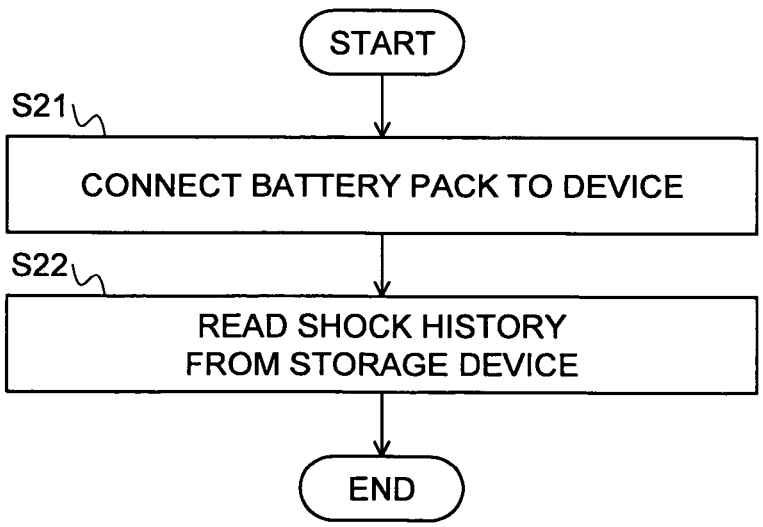
FIG. 5 is a reference process flowchart of the battery pack according to the present invention.

FIG. 5 is a reference process flowchart of the battery pack according to the present invention. When the data output terminal 11 of the battery pack 31 removed from the electronic device 30 is connected to the computer 34 (step S21), as shown in FIG. 3A, the diagnosis processing unit 35 detects this connection and reads through the data output terminal 11 the shock history stored in the storage device 5 (step S22), and displays it on the display device 36.

As shown in FIG. 3B, the processing of the detection processing unit 37 reading a detected voltage of the acceleration sensor 4 is executed substantially similarly to the reference process flowchart of FIG. 5.

Figure 6:
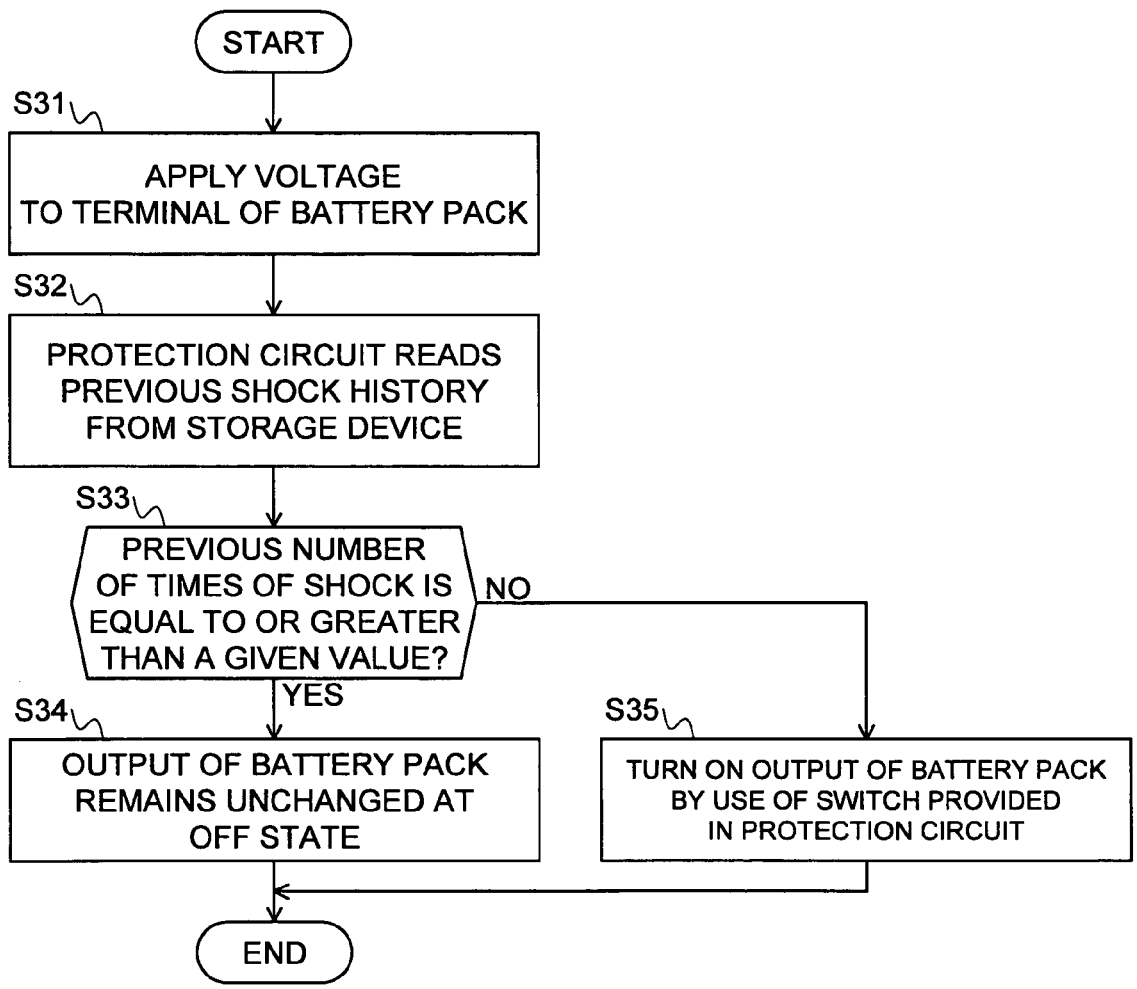
FIG. 6 is a recovery process flowchart of the battery pack according to the present invention.

FIG. 6 is a recovery process flowchart of the battery pack according to the present invention. As shown in FIG. 2C, a predetermined voltage is applied between the recovery terminal 12 and output terminal 9 of the battery pack 31, which is detached from the electronic device 30, from the power supply 33 (step S31). The control unit 20 of the protection circuit 2 reads the previous number of times of shock from the storage device 5 (step S32), and checks whether or not the read number of times of shock is equal to or greater than a predetermined value (step S33). When the read number of times of shock is equal to or greater than a predetermined value, the control unit 20 leaves the switch 6 unchanged at the off state, leaving the output of the battery pack 31 unchanged at the off state (step S34). On the other hand, when the read number of times of shock is smaller than a predetermined value, the control unit 20 changes the switch 6 from the off state to the on state to turn on the output of the battery pack 31, allowing current to flow through the output terminal 8 again (step S35).

FIG. 7 is a configuration diagram illustrating another exemplary battery pack according to the present invention. In the example of FIG. 7, the storage device 5 is provided within the protection circuit 2.

In the example of FIG. 7, when the voltage value read from the acceleration sensor 4 is equal to or greater than a threshold value, the control unit 20 stores the read voltage in the storage device 5 provided within the protection circuit 2. In this case, instead of the data output terminal 11 for reading data (shock history) from the storage device 5, a data output terminal 11' is provided. The shock history of the storage device 5 is read by the control unit 20, and sent (outputted) through the data output terminal 11' to the above described diagnosis processing unit 35. As represented by the broken line in FIG. 7, a data output terminal 11 may be provided without arranging the data output terminal 11'.

FIG. 8 is a configuration diagram illustrating another exemplary battery pack according to the present invention. In the example of FIG. 8, the storage device 5 is omitted, and instead of the storage device 5, a memory (hereinafter referred to as an internal memory, not shown) included in a CPU constituting the control unit 20 is used. That is, it is sufficient that the battery pack 31 includes a kind of storage unit.

In the example of FIG. 8, when the voltage value read from the acceleration sensor 4 is equal to or greater than a threshold value, the control unit 20 stores the read voltage in the internal memory in that order and creates a shock history. Consequently, there is no need to store the number of times of shock in the internal memory in addition to the shock history. In the example of FIG. 8, similarly to the example of FIG. 7, the data output terminal 11' is provided instead of the data output terminal 11. The shock history stored in the internal memory is sent through the data output terminal 11' to the above described diagnosis processing unit 35. As represented by the broken line in FIG. 8, the sensor output terminal 10 may be omitted. In this case, the output of the acceleration sensor 4 cannot be directly perceived. However, the number of terminals of the battery pack 31 can be reduced by one. The same also applies to the examples of FIGS. 1, 7 and 9.

FIG. 9 is a configuration diagram illustrating another exemplary battery pack according to the present invention. In the example of FIG. 9, a fuse cutting circuit 13 is further provided, compared to the example of FIG. 8. When a shock of a certain strength is given a predetermined number of times, the fuse cutting circuit 13 cuts the fuse 3, whereby thereafter no current flows from the battery pack 31 or the battery 7. The example of FIG. 9 is also applicable to the examples of FIGS. 1 and 7.

Though not shown, the fuse cutting circuit 13 can be constituted using first and second switches and a step-up circuit. The first switch connects a first terminal of the fuse 3 (a terminal connected to the output terminal 8) to the ground potential. The second switch connects a second terminal of the fuse 3 (a terminal connected to the battery 7) to the step-up circuit. The step-up circuit raises a voltage applied to the recovery terminal 12 to a predetermined value, and in response to a cutting signal from the control unit 20 of the protection circuit 2, the raised voltage is applied through the second switch to the fuse 3. As a result, a large current flows through the fuse 3, thus melting and cutting the fuse 3.

For example, as shown in FIG. 2C, a predetermined voltage is applied between the recovery terminal 12 and output terminal 9 of the battery pack 31 from the power supply 33. The control unit 20 reads information stored in the storage device 5, and sends a cutting signal to the fuse cutting circuit 13 instead of executing the step S34, when the number of times of shock is equal to or greater than a predetermined value in the step S33. In response to this, the fuse cutting circuit 13 causes a large current to flow through the fuse 3 to cut the fuse 3. Accordingly, the current path between the battery 7 and the output terminal 8 is cut off, changing the battery pack 31 to a disabled state. In the example of FIG. 9, the battery pack 31 is not returned to an enable state.

As described above, according to the present invention, in an electronic device provided with a battery pack, when a strong shock is given on the battery pack constituted of, for example, lithium-ion batteries or the like, the current path can properly be cut off based on the shock history to cut off the output of the battery pack, whereby the battery pack can be changed to a disabled state. As a result, it is possible to prevent catching-fire caused by a short circuit in the inside of the battery (individual cells) and to prevent a breakdown of the cell balance between the cells constituting the battery, and thus troubles such as overcharge or over-discharge due to the above can be prevented. Accordingly, failures or accidents of the electronic device due to the battery pack can be prevented from occurring, whereby safety can be ensured for the user.

What is claimed is:

1. A battery pack comprising:
   a battery;
   an output terminal outputting an output of the battery to the outside;
   detection means for detecting a shock and outputting a detected value dependent on the detection;
   output control means for cutting off the output of the battery from the output terminal when the detected value of the detection means is equal to or greater than a predetermined threshold value; and
   a storage unit storing a shock history which is a history of shock detected by the detection means,
   wherein the output terminal is a pair of terminals connected to the battery,
   wherein the output control means further includes:
      a switch inserted between the battery and one of the pair of terminals; and
      a control unit cutting off a current path between the battery and the pair of terminals by turning off the switch when the detected value of the detection means is equal to or greater than the predetermined threshold value,
   wherein, when the detected value of the detection means is equal to or greater than a threshold value, the control unit stores the detected value and a number of times of the detected value exceeding the threshold value as the shock history into the storage unit, and
   wherein, when the control unit detects the instruction signal, the control unit reads the shock history from the storage unit, and turns on the switch when the number of times of the detected value exceeding the threshold value is equal to or less than a predetermined value so that a current path forms between the battery and the pair of output terminals to allow the current to flow, or leaves the switch unchanged at the off state when the number of times of the detected value exceeding the threshold value is greater than the predetermined value.

2. A battery pack comprising:
   a battery;
   an output terminal outputting an output of the battery to the outside, the output terminal being a pair of terminals connected to the battery;
   detection means for detecting a shock and outputting a detected value dependent on the detection;
   output control means for cutting off the output of the battery from the output terminal when the detected value of the detection means is equal to or greater than a predetermined threshold value;
   a storage unit storing a shock history which is a history of shock detected by the detection means;
   a fuse provided between the battery and the pair of output terminals; and
   a fuse cutting circuit cutting the fuse,
   wherein the output terminal is a pair of terminals connected to the battery,
   wherein the output control means further includes:
      a switch inserted between the battery and one of the pair of terminals; and
      a control unit cutting off a current path between the battery and the pair of terminals by turning off the switch when the detected value of the detection means is equal to or greater than the predetermined threshold value, wherein the control unit reads the shock history from the storage unit, and sends a cutting signal to the fuse cutting circuit when the number of times of the detected value exceeding the threshold value is greater than a predetermined value, and wherein the fuse cutting circuit cuts the fuse based on the cutting signal.

3. The battery pack according to claim 2, wherein the detection means is an acceleration sensor.

4. The battery pack according to claim 2,
wherein the switch and the control unit are integrally formed as a protection circuit, and
wherein the storage unit is provided separately from the protection circuit.

5. The battery pack according to claim 2, wherein, when the control unit detects an instruction signal to instruct for executing a recovery processing, the control unit forms a current path between the battery and the pair of output terminals to allow the current to flow by turning on the switch.

6. The battery pack according to claim 2, further comprising:
a recovery terminal provided separately from the pair of output terminals,
wherein the instruction signal is a voltage applied to the recovery terminal.

7. The battery pack according to claim 6, wherein the voltage applied to the recovery terminal is a power source which drives the control unit.

8. The battery pack according to claim 2, further comprising:
a data output terminal provided separately from the pair of output terminals and reading the shock history from the storage unit,
wherein the battery pack outputs the shock history through the data output terminal.

9. The battery pack according to claim 2, further comprising:
a detection means output terminal provided separately from the pair of output terminals and reading the detected value from the detection means,
wherein the battery pack outputs the detected value through the detection means output terminal.

10. An electronic device comprising:
a battery pack detachably mounted on the electronic device; and
a load driven by an electric power supplied from the battery pack,
wherein the battery pack further comprises;
a battery;
an output terminal outputting an output of the battery to the outside;
detection means for detecting a shock and outputting a detected value dependent on the detection; and
output control means for cutting off an output of the battery from the output terminal when the detected value of the detection means is equal to or greater than a predetermined threshold value,
wherein the output terminal is a pair of terminals connected to the battery,
wherein the output control means further includes:
a switch inserted between the battery and one of the pair of terminals; and
a control unit cutting off a current path between the battery and the pair of terminals by turning off the switch when the detected value of the detection means is equal to or greater than the predetermined threshold value, wherein the battery pack further comprises a storage unit storing a shock history which is a history of shock detected by the detection means,
wherein, when the detected value of the detection means is equal to or greater than a threshold value, the control unit stores the detected value and a number of times of the detected value exceeding the threshold value as the shock history into the storage unit,
wherein, when the control unit detects an instruction signal to instruct for executing a recovery processing, the control unit forms a current path between the battery and the pair of output terminals to allow the current to flow by turning on the switch, and
wherein, when the control unit detects the instruction signal, the control unit reads the shock history from the storage unit, and turns on the switch when the number of times of the detected value exceeding the threshold value is equal to or less than a predetermined value so that a current path forms between the battery and the pair of output terminals to allow the current to flow, or leaves the switch unchanged at the off state when the number of times of the detected value exceeding the threshold value is greater than the predetermined value.

11. An electronic device comprising:
a battery pack detachably mounted on the electronic device; and
a load driven by an electric power supplied from the battery pack,
wherein the battery pack further comprises;
a battery;
an output terminal outputting an output of the battery to the outside;
detection means for detecting a shock and outputting a detected value dependent on the detection; and
output control means for cutting off an output of the battery from the output terminal when the detected value of the detection means is equal to or greater than a predetermined threshold value,
wherein the output terminal is a pair of terminals connected to the battery,
wherein the output control means further includes:
a switch inserted between the battery and one of the pair of terminals; and
a control unit cutting off a current path between the battery and the pair of terminals by turning off the switch when the detected value of the detection means is equal to or greater than the predetermined threshold value,
wherein the battery pack further comprises a storage unit storing a shock history which is a history of shock detected by the detection means,
wherein, when the detected value of the detection means is equal to or greater than a threshold value, the control unit stores the detected value and a number of times of the detected value exceeding the threshold value as the shock history into the storage unit,
wherein the battery pack further comprises:
a fuse provided between the battery and the pair of output terminals; and
a fuse cutting circuit cutting the fuse,
wherein the control unit reads the shock history from the storage unit, and sends a cutting signal to the fuse cutting circuit when the number of times of the detected value exceeding the threshold value is greater than a predetermined value, and
wherein the fuse cutting circuit cuts the fuse based on the cutting signal.

12. The electronic device according to claim 11, wherein the detection means is an acceleration sensor.

13. The electronic device according to claim 11,
wherein the switch and the control unit are integrally formed as a protection circuit, and
wherein the storage unit is provided separately from the protection circuit.

14. The electronic device according to claim 11, wherein, when the control unit detects an instruction signal to instruct for executing a recovery processing, the control unit forms a current path between the battery and the pair of output terminals to allow the current to flow by turning on the switch.

15. The electronic device according to claim 11,
wherein the battery pack further comprises a recovery terminal provided separately from the pair of output terminals, and
wherein the instruction signal is a voltage applied to the recovery terminal.

16. The electronic device according to claim 15, wherein the voltage applied to the recovery terminal is a power source which drives the control unit.

17. The electronic device according to claim 11,
wherein the battery pack further comprises a data output terminal provided separately from the pair of output terminals and reading the shock history from the storage unit, and
wherein the battery pack outputs the shock history through the data output terminal.

18. The electronic device according to claim 11,
wherein the battery pack further comprises a detection means output terminal provided separately from the pair of output terminals and reading the detected value from the detection means, and
wherein the battery pack outputs the detected value through the detection means output terminal.

* * * * *